(12) United States Patent
Gluch

(10) Patent No.: US 6,476,577 B1
(45) Date of Patent: Nov. 5, 2002

(54) MOTOR CONTROL CIRCUIT

(75) Inventor: Mark William Gluch, Grosse Ile, MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/401,458

(22) Filed: Sep. 22, 1999

(51) Int. Cl.[7] ............................................... G05B 11/01
(52) U.S. Cl. ...................... 318/631; 318/811; 318/599; 318/254; 318/138; 318/439; 318/807
(58) Field of Search ................. 318/811, 579, 318/254, 138, 439, 798, 799, 807, 812, 631; 388/805, 806

(56) References Cited

U.S. PATENT DOCUMENTS

| | | | | |
|---|---|---|---|---|
| 4,631,458 A | * | 12/1986 | Furiuchi | 318/254 |
| 4,651,076 A | * | 3/1987 | Oltendorf et al. | 318/696 |
| 5,001,407 A | | 3/1991 | Suzuki et al. | |
| 5,577,153 A | * | 11/1996 | Bocchiola | 388/811 |
| 5,589,805 A | | 12/1996 | Zuraski et al. | |
| 5,789,891 A | * | 8/1998 | Nakane | 318/254 |
| 6,028,411 A | * | 2/2000 | Motzko et al. | 318/606 |

* cited by examiner

*Primary Examiner*—Karen Masih
(74) *Attorney, Agent, or Firm*—Visteon Global t Tech., Inc.

(57) ABSTRACT

A motor control circuit 10 which controls the speed of a motor 12 by the use of pseudo-randomly generated signals 52.

14 Claims, 1 Drawing Sheet

MOTOR CONTROL CIRCUIT

FIELD OF THE INVENTION

This invention relates to a motor control circuit and more particularly, to a motor control circuit which selectively controls the speed of a motor.

BACKGROUND OF THE INVENTION

Motor control circuits are used to selectively measure and control the operating speed of a motor. Typically, these circuits utilize a rotary encoder which measures the current speed of the motor and a phase-locked loop type of circuit which compares the measured speed to a desired speed value and which provides an error signal having a value which is substantially equal to the difference between the desired and measured speed values. The error signal is then communicated to a comparator which compares the error signal to a certain reference signal which is generated by a pulse width signal modulation circuit. Based upon the comparison between the reference signal and the error signal, the comparator selectively generates and transmits a motor speed control signal to an electrical power source. The electrical power source is typically coupled to the motor and communicates electrical voltage and current to the motor, effective to allow the motor to operate at a certain speed. The motor speed control signal, emanating from the comparator, is typically effective to modify the amount or level of electrical power (e.g. the duty cycle of the generated and communicated electrical current) which is communicated to the motor, thereby desirably changing the operating speed of the motor. While these prior motor control circuits do adequately control the speed of the motor they suffer from some drawbacks.

For example and without limitation, the pulse width modulation circuit, of these prior motor control circuits, typically utilizes a relatively high single frequency signal which is effective to cause the comparator to generate the previously described motor speed control signal. This single relatively high frequency signal therefore switches the power supply at a relatively high rate which causes the creation of significant switching type power losses due to the inability of the power supply, which is typically of the solid-state or semiconductor type, to instantaneously respond to the received motor speed control signal. This relatively high single frequency signal also creates relatively high levels or amounts of electromagnetic interference (EMI) and/or radio frequency interference (RFI); the amount or level of the produced EMI and RFI being directly proportional to the frequency of the produced signal. Further, this relatively high level or amount of EMI and RFI typically creates a "spike" of energy within a relatively narrow frequency range which undesirably interferes with the electronic assemblies and/or devices which are operatively contained within the device and/or assembly within which the motor resides, such as a vehicle.

There is therefore a need for a motor control circuit which desirably controls the operating speed of a motor while substantially reducing the amount of the switching type electrical power losses and the amount or level of EMI and RFI emissions.

SUMMARY OF THE INVENTION

It is a first object of the invention to provide a motor control circuit which overcomes at least some of the previously delineated drawbacks of prior motor control circuits.

It is a second object of the invention to provide a motor control circuit which overcomes at least some of the previously delineated drawbacks of prior motor control circuits and which selectively and automatically controls the operating speed of a motor.

According to a first aspect of the present invention, a circuit is provided for use in combination with an error signal production circuit of the type which produces an error signal indicative of the speed of a motor. The provided circuit includes a signal generator which generates pseudo-random signals; a wave shaping circuit which is coupled to the signal generator, which receives the pseudo-random signals, and which generates at least one signal based upon the received pseudo-random signals; a comparator which receives the at least one signal and the error signal, which compares the at least one signal with the error signal and, based upon the comparison, which generates a motor speed signal which is effective to control the speed of the motor.

According to a second aspect of the present invention a method for controlling the speed of a motor is provided. The method includes the steps of providing a desired speed; measuring the speed of the motor; creating an error value by comparing the desired speed with the measured speed; pseudo-randomly generating a plurality of signals; comparing the error value to one of the pseudo-randomly generated signals; and controlling the speed of the motor based upon the comparison between the error value and the one pseudo-randomly generated signal.

These and other features, aspects, and advantages of the invention will become apparent from the following detailed description of the preferred embodiment of the invention and by reference to the attached drawings.

DETAILED DESCRIPTION OF THE DRAWINGS

DETAILED DESCRIPTION OF THE PREFERRED EMBODIMENT

Figure 1:
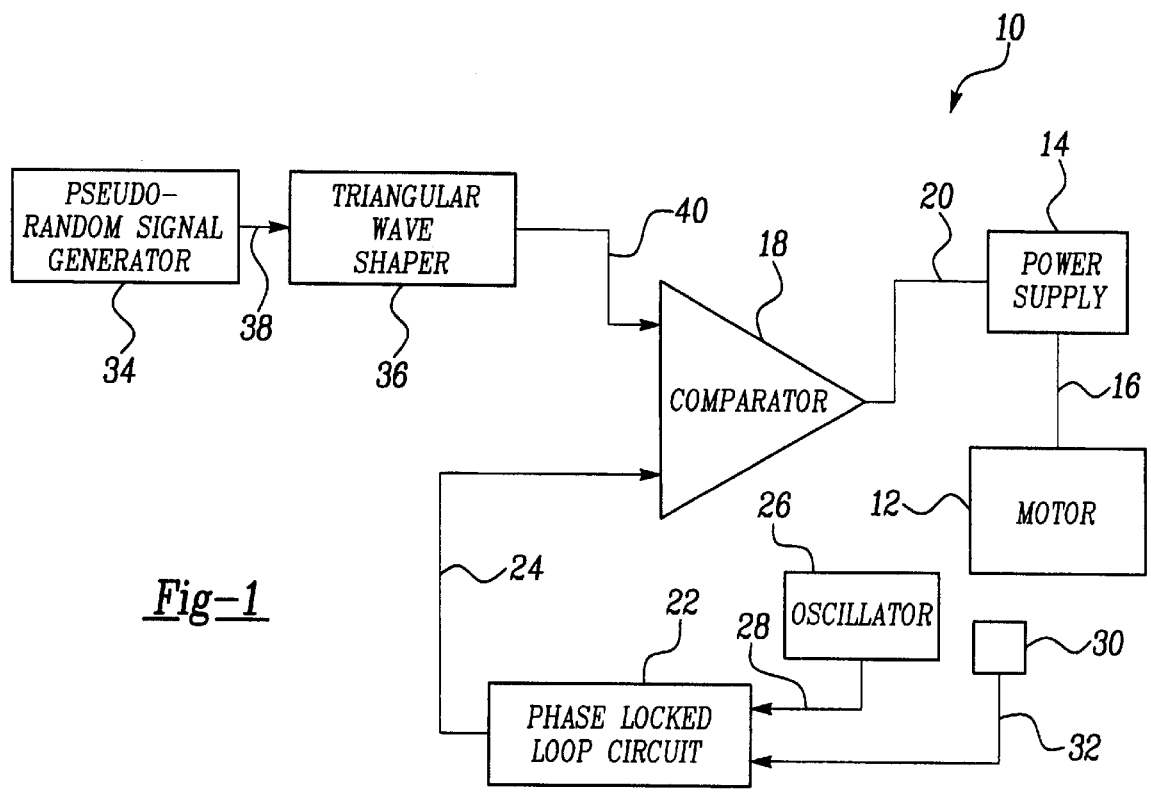
FIG. 1 is an electrical block diagram of a motor control circuit which is made in accordance with the teachings of the preferred embodiment of the invention.

Referring now to FIG. 1, there is shown a motor control circuit 10 which is made in accordance with the teachings of the preferred embodiment of the invention and which is adapted to selectively control the operating speed of a conventional and commercially available motor 12, such as a motor which is used within a vehicle. As shown, circuit 10 includes an electrical power supply 14 which is physically, electrically, and communicatively coupled to the motor 12 by a bus 16. Power supply 14 selectively provides electrical voltage and electrical current to the motor 12, by the use of bus 16, effective to cause the motor 12 to operate or run at a certain speed. The power supply 14 is physically, electrically, and communicatively coupled to a comparator 18 by use of bus 20. Particularly, comparator 18 generates signals and communicates these generated signals to the power supply 14, by use of the bus 20. The signals, when received by the power supply 14, are effective to control the amount of electrical voltage and/or electrical current (e.g., electrical power) which is supplied to the motor 12, thereby controlling the duty cycle of the generated and communicated electrical current. Hence, the communicated signals, which emanate from the comparator 18, are effective to control the operating speed of the motor 12.

Figure 2:
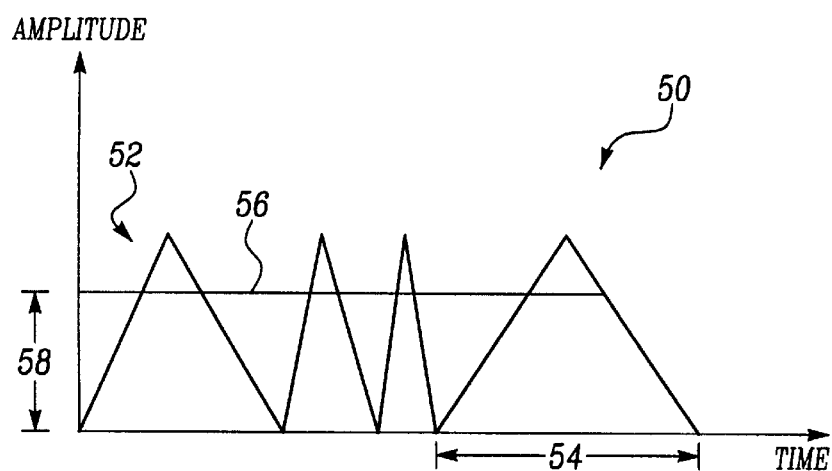
FIG. 2 is a graph illustrating a pseudo-randomly generated triangular reference signal and an error signal which are used by the motor control circuit of FIG. 1.

Circuit 10 further includes and/or is adapted to be operatively connected to a conventional phase locked loop circuit 22 which is physically, electrically, and communicatively coupled to the comparator 18 by use of bus 24. Phase locked loop circuit 22 is also physically, electrically, and communicatively coupled to an oscillator 26 by bus 28 and to a rotary encoder 30 by use of bus 32. Circuit 10 further includes a pseudo-random signal generator 34 which is physically, electrically, and communicatively coupled to a conventional triangular wave shaper 36 by use of bus 38. The triangular wave shaper 36 is physically, electrically, and communicatively coupled to the comparator 18 by use of bus 40 and cooperates with the signal generator 34 to form a pulse width modulation assembly which generates triangularly shaped signals 52 (shown in graph 50 of FIG. 2), on bus 40, having pseudo-randomly varying frequencies or periods 54.

In operation, the oscillator 26 generates and provides signals to the phase locked loop circuit 22, by use of bus 28, which have a frequency and/or an amplitude which is substantially equal to and/or proportional to and/or indicative of a desired or target operating speed of the motor 12. The rotary encoder 30 measures the current or actual operating speed of the motor 12 and generates signals to the phase locked loop circuit 22, by use of bus 32, which have a frequency and/or an amplitude which represents the measured and current or actual operating speed of the motor 12. The phase locked loop circuit 22 compares the respective signals from the rotary encoder 30 and the oscillator 26 and, as shown in graph 50 of FIG. 2, generates an error signal 56, on bus 24, which has an amplitude 58 which represents or indicates the deviation or difference of the current motor speed from the desired or target motor operating speed. It should be realized that phase locked loop circuit 22 may be replaced by a variety of sensors and/or other electronic, electromechanical and/or optical devices and/or assemblies which provide and/or cooperatively provide a motor speed error signal, and that this invention is not limited to a phase locked loop circuit 22. Rather, circuit 10 may be used with a wide variety of motor speed error production and/or generating circuits.

The comparator 18 receives this error signal 56 and also receives the triangularly shaped pseudo-random signals 52 which are generated from signal shaper 36 and which are communicated to the comparator 18 on bus 40. In one embodiment, the comparator 18 generates a speed control signal on bus 20 during the time when the amplitude 58 of the error signal 56 is higher than the amplitude of the triangularly shaped signals 52.

If the amplitude 58 of the error signal 56 is relatively large, the motor control signal will be produced and communicated to the power supply 14 for a relatively large or long duration of time (e.g., the relatively large error signal will have an amplitude which will be greater than the amplitude of the triangular shaped wave signals 52 for a relatively long period or duration of time), effective to increase the duty cycle of the electrical current which is supplied by the power supply 14 to the motor 12 and causing the operating speed of the motor 12 to be increased.

When the operating speed of the motor 12 exceeds the desired operating speed, the amplitude 58 of the amplitude of the error signal 56, emanating from the phase locked loop circuit 22, is reduced from the level which increases the speed of the motor 12 in the manner described above. Particularly, this relatively low amplitude error signal 56 decreases the duration of time that the motor control signal will be generated by comparator 18, since this low amplitude error signal 56 will only be greater than the amplitude of the triangularly shaped signals 52 for a relatively small or short period of time, thereby causing the duty cycle of the supplied electrical current to be reduced. Moreover, should the respective frequency and/or amplitude of the signals emanating from the rotary encoder 30 and from the oscillator 26 be substantially equal (i.e., the current operating speed of the motor 12 is substantially equal to the desired or target speed), the phase locked loop circuit 22 will generate a signal 56 having a predetermined amplitude which causes the duty cycle of the generated electrical current and the motor operating speed to be held relatively constant.

It should also be realized that the pseudo-randomly generated signals, emanating from the generator 34, produce relatively low amounts of EMI and RFI since the frequency of the pseudo-randomly generated triangularized signals 52 is "spread across" and/or desirably dispersed across the frequency spectrum. Hence, circuit 10 substantially prevents a relatively large "spike" of noise to occur at a single or relatively narrow frequency band, thereby effectively causing the utilized signal spectrum to be "distributed" or "broadened" in a non-uniform manner. Moreover, circuit 10 also reduces the amount or level of switching type power loss since the previously delineated "spreading out" of the utilized frequency of the generated signals reduces the average frequency and allows the power supply 14 to be switched at relatively lower frequencies than that associated and/or utilized by prior motor control circuits. Circuit 10 therefore overcomes the previously delineated drawbacks of prior motor control circuits while allowing the motor 12 to be desirably and automatically controlled. It should be further realized that the signal output from generator 34 may also be selectively coupled to a microprocessor and/or microcontroller and be utilized as the operating clock of the microprocessor or microcontroller, effective to provide many of the same benefits as previously described (e.g., a reduction in "switching type" electric power losses and a reduction in EMI and RFI levels).

It is to be understood that the invention is not limited to the exact construction and/or method which has been described, but that various changes and modifications may be made without departing from the spirit and/or the scope of the invention.

What is claimed is:

1. A circuit for use in combination with an error signal production circuit of the type which produces an error signal indicative of the speed of a motor, said circuit comprising:

a signal generator which generates pseudo-random signals;

a wave shaping circuit which is coupled to said signal generator, which receives said pseudo-random signals, and which generates at least one signal based upon said received pseudo-random signals;

a comparator which receives said at least one signal and said error signal, which compares said at least one signal with said error signal and, based upon said comparison, which generates a motor speed control signal which is effective to control said speed of said motor.

2. The circuit of claim 1 wherein said at least one signal is triangularly shaped.

3. The circuit of claim 1 further comprising an oscillator which is coupled to said error signal production circuit and which generates at least one signal representative of a desired speed of said motor.

4. The circuit of claim 3 further comprising a rotary encoder which is coupled to said error signal production circuit and which measures the speed of said motor and which communicates said measured speed to said error signal production circuit.

5. The circuit of claim 4 wherein said error signal production circuit comprises a phased locked loop circuit.

6. A circuit for use in combination with a motor which is operable at a plurality of speeds, said circuit comprising:

an oscillator which generates a first signal;

an encoder which senses the speed of said motor and which generates a second signal which is indicative of said sensed speed;

an error signal production circuit which receives said first and second signals, which compares said first and second signals, and which generates a third signal based upon said comparison;

a pseudo-random signal generator which generates a pseudo-random signal;

a wave shaper which receives said pseudo-random signal and which uses said received pseudo-random signal to produce a fourth signal;

a comparator which receives said third and fourth signals, which compares said received third and fourth signals and, based upon said comparison, which generates fifth signal; and an electrical power supply circuit which is coupled to a source of electrical power and to said motor and which receives said fifth signal and which provides electrical power to said motor in accordance with said fifth signal.

7. The circuit of claim 6 wherein said error signal production circuit comprises a phased locked loop circuit.

8. The circuit of claim 6 wherein said fourth signal is triangularly shaped.

9. The circuit of claim 7 wherein said third and fourth signals have certain respective amplitudes and wherein said fifth signal is generated only when said amplitude of said third signal exceeds said amplitude of said fourth signal.

10. A method for controlling the speed of a motor comprising the steps of:

providing a desired speed;

measuring the speed of said motor;

creating an error value by comparing said measured speed with said desired speed;

pseudo-randomly generating a plurality of signals;

comparing said error value to one of said plurality of pseudo-randomly generated signals; and controlling said speed of said motor based upon said comparison between said error value and said one of said plurality of pseudo-randomly generated signals.

11. The method of claim 10 wherein said pseudo-randomly generated signals are triangularly shaped.

12. The method of claim 10 wherein said step of providing a desired speed includes the steps of providing an oscillator which generates a signal at a certain frequency; and causing said certain frequency to be representative of said desired speed.

13. The method of claim 12 wherein said step of measuring said current speed of said motor comprises the steps of providing a rotary encoder; and causing said rotary encoder to measure said speed of said motor.

14. The method of claim 13 wherein said step of creating said error value comprises the steps of providing a phase locked loop circuit; and causing said provided phase locked loop circuit to create said error value.

* * * * *